Aug. 27, 1963 N. E. CHASEK Re. 25,436

FREQUENCY MODULATED BALANCED DISCRIMINATOR

Original Filed Jan. 15, 1959

INVENTOR
N. E. CHASEK
BY Stw. Adams, Jr.
ATTORNEY

United States Patent Office

Re. 25,436

Reissued Aug. 27, 1963

25,436

FREQUENCY MODULATED BALANCED DISCRIMINATOR

Norman E. Chasek, Stamford, Conn., assignor to Bell Telephone Laboratories, Incorporated, New York, N.Y., a corporation of New York Original No. 2,984,791, dated May 16, 1961, Ser. No. 786,949, Jan. 15, 1959. Application for reissue May 2, 1963, Ser. No. 278,526

2 Claims. (Cl. 329—141)

Matter enclosed in heavy brackets [ ] appears in the original patent but forms no part of this reissue specification; matter printed in italics indicates the additions made by reissue.

This invention relates to discriminators for frequency modulation receivers and more particularly to improvements in balanced discriminators for such use.

In the reception of frequency modulated waves by the method wherein a discriminator is employed, excellence of performance may be measured in terms of linearity and output power. One approach to the design of discriminators having these desirable characteristics involves the so-called "balanced discriminator" wherein two frequency sensitive circuits are respectively connected in the anodes of a pair of amplifier tubes to the grids of which is applied the same frequency modulated intermediate frequency carrier. Ideally, when the two halves of the circuit are balanced exactly and the carrier frequency is centered with respect to the resonant frequencies of the two tuned circuits, even order distortion will cancel and odd order distortion will add. The principal source of distortion is the third order distortion and a maximally linear discriminator results where the third derivative of each half of the discriminator may be made zero.

In practice, however, the achievement of such results is at best difficult and even where they may be achieved, tube replacement or unequal aging of various circuit components causes rapid deterioration of performance.

It is, therefore, the object of the present invention to improve the linearity, stability, and power capability of balanced discriminators for frequency modulation reception.

According to the invention, there is provided in a receiver for frequency modulated waves, a discriminator including at least a pair of amplifiers having resonant circuits connected in their outputs and tuned to frequencies different from each other and from the center frequency of the wave to be demodulated. In addition, the input circuits of the two amplifiers are interconnected and include, in a common branch, a third resonant circuit tuned to the center frequency, the bandwidth or quality (Q) of the output resonant circuits being at least double the quality of the input resonant circuit.

The above and other features of the invention will be described in further detail in the following specification taken in connection with the drawing in which.

As stated above, a maximally linear discriminator results when a balanced circuit configuration is employed and where the third derivative of the input-output characteristic of each half of this circuit is zero. Where, as in the present invention, a single pole resonant circuit is placed in the input circuit in such a way as to be common to the inputs of the two amplifier devices, design for optimum performance may be accomplished by setting the two resulting zeros of the third derivative of the product of the input and output transfer impedances of the amplifying device arbitrarily close together. To this end, it is assumed that the two halves of the discriminator are the same and that the design for one half may be repeated for the other to obtain a practicable circuit.

Figure 1:
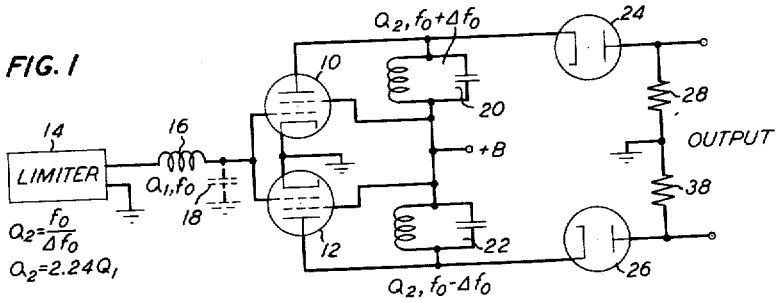
FIG. 1 is a schematic diagram of a discriminator embodying the features of the invention.

By way of example, there is shown in FIG. 1 a basic discriminator circuit according to the invention wherein vacuum tubes 10 and 12 serve as amplifying means. The grids of these two tubes are connected together and to the output of a conventional limiter 14 by way of a common circuit including an inductor 16 and a capacitor 18. Inductor 16 and capacitor 18 represent a single pole resonant circuit and it will be understood that at least the capacitor may constitute the stray input capacitance of amplifier tubes 10 and 12. This input resonant circuit is tuned to a frequency $f_0$, which is the center frequency or the frequency of the intermediate frequency carrier, which is frequency modulated by waves to be detected. In the anode circuits of tubes 10 and 12, respectively, are connected tuned circuits 20 and 22, tuned to frequencies which will be determined hereinafter but which both differ from $f_0$ by an amount $\Delta f_0$. The outputs of the two amplifiers 10 and 12 are rectified in the usual manner in diodes 24 and 26, respectively, and combine in resistors 28 and 38 to provide a balanced output in the usual manner.

The detailed design of the resonant circuits may now be considered. For this purpose, the normalized absolute transfer impedances of the grid and plate circuits of one amplifier, for example, 10, are written $$|Z_G(\Delta f_1)|=\frac{1}{\sqrt{1+K_1^2\Delta f_1^2}} \tag{1}$$

$$|Z_P(\Delta f_2)|=\frac{1}{\sqrt{1+K_2^2\Delta f_2^2}} \tag{2}$$

where $\Delta f_1$ and $\Delta f_2$ are respectively frequency differences from the resonant frequencies of the grid and plate tuned circuits, respectively, and $$K_1=\frac{2Q_1}{f_1}, \text{ and } K_2=\frac{2Q_2}{f_2}$$

Here, $Q_1$ and $Q_2$ represent the circuits Q's or qualities of the grid and plate circuits, and $f_1$ and $f_2$ are the resonant frequencies of the same circuits.

The expressions and Equations 1 and 2 for transfer impedances may be expanded by Taylor series and the product determined. If the third order terms are collected from this product, the expression for third order distortion may be written $$D_3=\frac{Z_1''Z_2'}{2}+\frac{Z_1'Z_2''}{2}+\frac{Z_1Z_2'''}{6}+\frac{Z_2Z_1'''}{6} \tag{3}$$

Ideally, the third order distortion should be made zero and for this purpose $\Delta f_1$ will be assumed to be zero and $\Delta f_2$ will be treated as a variable. This will permit determination of the relative position of the two resonances of the plate tuned circuit which will eliminate third order distortion.

If the appropriate derivatives of Equation 1 are substituted in Equation 3 and $D_3$ is set equal to zero, an equation in quadratic form may be obtained and solutions for X, the resonances which will eliminate third order distortion, may be obtained, these being given by $$X=\pm\sqrt{\frac{K_2^2-K_1^2}{(K_2K_1)^2}\left(1\mp\sqrt{1-\frac{K_1^2(3K_2^2+K_1^2)}{(K_1^2-K_2^2)^2}}\right)} \tag{4}$$

Only the positive values of X are taken as solutions and it becomes necessary to determine the separation of these resonances for any particular discriminator. The two values can be moved arbitrarily close to each other by making $$\frac{K_1^2(3K_2^2+K_1^2)}{(K_1^2-K_2^2)^2}=1+\delta \qquad (5)$$

where $\delta$ approaches zero. The best value $\delta$ is that which minimizes higher order distortion terms and still keeps the third order term equal to zero or near this value. This is determined experimentally and the solution to Equation 5 may be written $$K_2 \cong \sqrt{5}K_1(1+.3\delta) \qquad (6)$$

If Equation 6 is substituted into Equation 4 and $\delta$ is made equal to zero, then $K_2X$ equals 2 and $$\frac{K_2}{K_1}=2.24 \qquad (7)$$

$$K_2\Delta f_0 \cong 2 \qquad (8)$$

Figure 3:
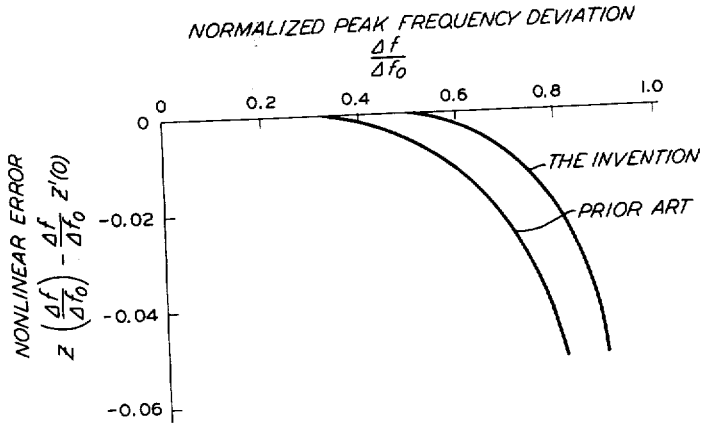
FIG. 3 is a graph by which the performance of the discriminator of the invention can be compared with that of a convenional balanced discriminator.

The performance of the discriminator may be contrasted with that of conventional prior balanced circuits by reference to the error curves of FIG. 3 in which the right-hand curve represents the discriminator of the invention and the left-hand curve represents a discriminator employing the design criterion suggested in section 4.3 of Frequency Modulation by L. B. Arguimbau and R. D. Stuart, John Wiley and Sons, Inc., 1956. In the graph of FIG. 3, $Z'(0)$ is the first derivative of $Z(f)$ taken at the frequency where the third order distortion is zero.

Figure 2:
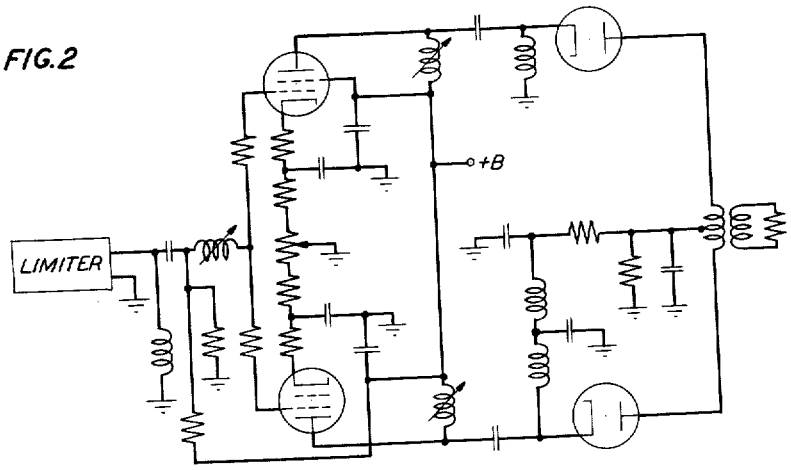
FIG. 2 is a circuit diagram of a balanced discriminator according to the invention.

By way of example, the circuit of FIG. 2 represents a discriminator according to the invention designed for a 10-megacycle pass band centered at 70 megacycles and having a peak frequency deviation of $\mp 2.5$ megacycles. It is determined that good linearity will result even with some allowance for drift in the carrier frequency $f_0$, if a value of $$\frac{\Delta f}{\Delta f_0}$$

is taken at 0.45, where $\Delta f$ is the frequency deviation and $\Delta f_0$ is the separation of the resonant peak from the center frequency. From the above, $\Delta f_0$ becomes 5.55 megacycles and the resonant peaks occur at 64.45 megacycles and 75.55 megacycles. The quality, $Q_2$, of the tuned circuit connected in the plate of the amplifier may be determined from Equation 8 as follows:

$$\left[K_2\Delta f_0=\frac{Q_2\Delta f_0}{f_0}=2 \qquad (9)\right]$$

$$K_2\Delta f_0=\frac{2Q_2\Delta f_0}{f_0}=2 \qquad (9)$$

*and*

$$Q_2=\frac{f_0}{\Delta f_0}$$

Since $f_0$ equals 70 megacycles, $Q_2$ becomes 12.6 and the quality $Q_1$ for the grid resonant circuit is determined as follows:

$$\frac{K_2}{K_1}=\frac{Q_2}{Q_1}=\frac{12.6}{Q_1}=2.24 \qquad (10)$$

Thus $Q_1$ equals 5.6.

Measurements indicate that the discriminator circuit of FIG. 2, designed as set forth above, produces 7 db more output power for the same linearity over a 10 megacycles pass band than conventional discriminator circuits heretofore. Further, the harmonic distortion to be canceled is 15 db less. Thus, linearity is less sensitive to tube or other unbalance and the advantageous results are more consistently available.

What is claimed is:

1. In a receiver for frequency modulated waves, a discriminator comprising first and second amplifying means, each having an output circuit and at least a control element, means interconnecting said control elements to form a common input path, a first resonant input circuit having a quality $Q_1$ and tuned to the carrier frequency $f_0$ of the incoming frequency modulated waves in said common input circuit, individual resonant circuits connected in the output circuits of said first and second amplifying means, respectively, and tuned to frequencies other than $f_0$, said other frequencies differing from $f_0$ by a quantity $\Delta f_0$ and having equal qualities $Q_2$ equal to $$\left[\frac{2f_0}{\Delta f_0}\right]$$

$$\frac{f_0}{\Delta f_0}$$

the quality of said input resonant circuit $Q_1$ being of the order of one-half the quality of $Q_2$.

2. In a receiver for frequency modulated waves, a discriminator comprising first and second amplifiers, each having an input circuit and an output circuit, means interconnecting said input circuits to form a common input path for frequency modulated waves, a single pole resonant circuit in said common path tuned to the carrier frequency $f_0$ of the waves to be received and having a quality $Q_1$, individual output circuits for said amplifiers, each including a resonant circuit having a quality $Q_2$ equal to 2.24 $Q_1$, the quality $Q_2$ being equal to $$\left[\frac{2f_0}{\Delta f_0}\right]$$

$$\frac{f_0}{\Delta f_0}$$

where $\Delta f_0$ represents the difference between resonant frequencies of the tuned circuits of said amplifier outputs and $f_0$, and means for combining the output signals from said amplifiers.

References Cited in the file of this patent or the original patent

UNITED STATES PATENTS

| | | |
|---|---|---|
| 2,156,376 | Crosby | May 2, 1939 |
| 2,204,575 | Crosby | June 18, 1940 |
| 2,205,847 | Crosby | June 25, 1940 |
| 2,243,214 | Krauth | May 27, 1941 |
| 2,674,690 | Arguimbau et al. | Apr. 6, 1954 |